July 17, 1962

D. VON SANDEN 3,045,063

TELEGRAPH SYSTEMS

Filed May 31, 1960

Inventor
DIETER VON SANDEN
By Toulmin & Toulmin
Attorneys

United States Patent Office 3,045,063
Patented July 17, 1962

3,045,063

TELEGRAPH SYSTEMS

Dieter von Sanden, Munich-Solln, Germany, assignor to Siemens & Halske Aktiengesellschaft, Berlin and Munich, Germany, a German company Filed May 31, 1960, Ser. No. 32,713
Claims priority, application Germany June 9, 1959
11 Claims. (Cl. 178—70)

Figure 1:
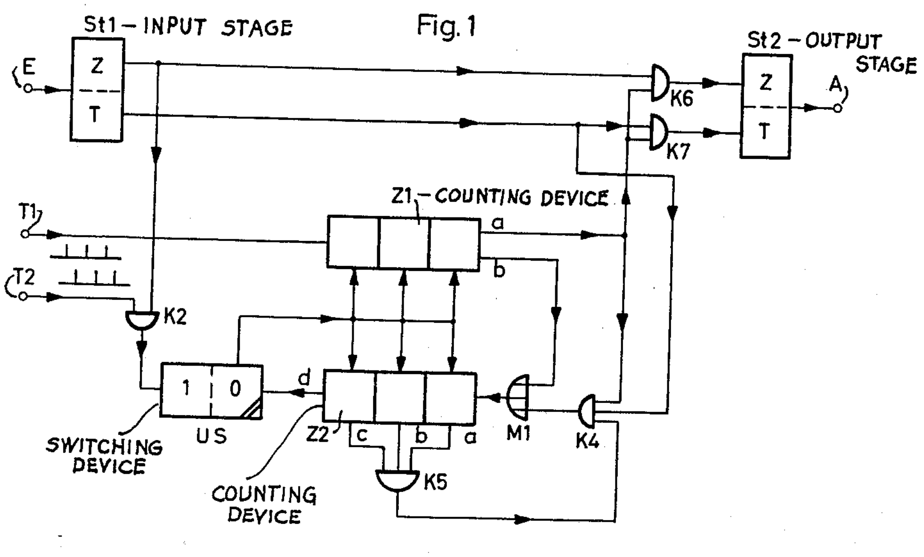

This invention relates to telegraph systems for restoring start-stop telegraph signals to a condition substantially free from distortion.

In the following description, the term "code elements" applies only to the elements of a signal which actually contain the information and does not apply to the start and stop pulses.

It has previously been proposed to construct a device for removing distortion from telegraph signals which is started when a start pulse is transmitted and that scans the individual pulses of the telegraph signal in their nominal centres and transmits them undistorted. After a telegraph signal has terminated, that is after a definite time interval, the device should be automatically returned to its starting condition so as to be ready to be triggered off again. One such device uses a generator which starts oscillating at the beginning of a start pulse and delivers a number of scanning pulses derived from these oscillations and each having equal time intervals, the duration of one complete oscillation corresponding to the duration of a non-distorted current pulse. The generator is switched off when the current pulse of the last scanning pulse is of the same polarity as a stop pulse. If during the last scanning pulse no space current polarity is detected the generator continues to oscillate and delivers scanning pulses until stop polarity does occur. This may only occur after a number of further nominal pulse widths, for example in the transmission of selector pulses. The distortion-removing cycle may therefore have a different duration for different signals and may, for example, depend on the type of selector pulse sequences.

It is an object of the present invention to provide a telegraph circuit which is automatically returned to its initial inoperative condition whether the last code element is of the same current polarity as the stop pulse or not.

It is also an object of the invention to provide a telegraph pulse shaping circuit including means for receiving start-stop telegraph signals, means for scanning said received signals, bi-stable means controlled by said scanning means for transmitting correctly shaped pulses corresponding to said received signals, means for disabling said scanning means at the end of a pre-determined number of pulse intervals after the receipt of a start pulse if the last pulse received before that time has stop polarity and for allowing said scanning means to operate for one further pulse interval if the last pulse received before said time has start polarity.

It is also an object of the invention to provide a telegraph circuit capable of restoring telegraph pulse signals in a start-stop telegraph system to a condition substantially free from distortion, including a circuit device for returning the telegraph circuit to its initial inoperative condition at an instant which is earlier by a time equal to the time duration of one pulse when a pulse occurring at a pre-determined time after each start pulse has the same polarity as a stop pulse than when the pulse occurring at said time has a different polarity from that of a stop pulse.

It is also an object of the invention to provide a telegraph circuit capable of restoring telegraph signals in a start-stop telegraph system to a condition substantially free from distortion, said signals being liable to be coded alternatively to have both $n$ and $(n+1)$ code elements, including a circuit device for returning the telegraph circuit to its initial inoperative condition at an instant which is earlier by a time equal to the time duration of one pulse when the $(n+1)$th pulse after a start pulse has the same polarity as a stop pulse than when said $(n+1)$th pulse has a different polarity from that of a stop pulse.

Sometimes it is desired to use the same teleprinter transmission paths of a telegraph system when operating in one unit code, for example a five unit code, as when operating in another unit code, for example a six unit code.

One embodiment of the present invention will now be described by way of example with reference to the accompanying drawing as applied to a start-stop telegraph system for signals having five or six code elements. The input E in its normal condition (with no signal) has the polarity of a stop pulse. In a start-stop telegraph system, as will be appreciated, stop pulses and start pulses are of opposite polarity. For example, the start pulses may be of negative polarity and the stop pulses of positive polarity. On the appearance of a start pulse of a telegraph signal at an input E an input stage *St1* is switched from a T state to a Z state. Thereby the "AND" gating circuit K2 is opened and a clock pulse of a clock pulse train T2 can pass through this gate to switch a two stage switching device US into a one state. The resetting effect of the switching device on the counting devices Z1 and Z2, previously prevented from counting due to the switching device US being in its zero state, is cancelled when the switching device US is changed to its one state and the counter Z1 starts to count pulses of a clock pulse train T1 which is applied to its input. The counting devices Z1 and Z2 may be binary counters whose individual stages include bistable flip-flop circuits. Examples of this type of binary counter are shown in United States patent specification No. 2,785,225, where each stage includes a double triode, one triode being conductive while the other is not conductive. The switching device US, the input stage *St1* and the output stage *St2* may be bistable flip-flop circuits.

The pulses T1 have the same repetition frequency as a code element but have a duration which is shorter than the duration of a code element. The pulses T1 are 180° out of phase with respect to the clock pulses T2. The telegraphy speed is 50 bauds and after 10, 30 . . . milliseconds, therefore always at the nominal pulse centres measured from the beginning of the starting step, i.e. the position at which the pulse centres should occur, scanning gates K6 and K7 are thereby unlocked so that a bi-stable output stage *St2* can change so as to be in the same state as the input stage *St1*. Simultaneously the counter Z1 delivers pulses at the instances 20, 40 . . . milliseconds which are applied to the second counter Z2 through a mixing "OR" gating circuit M1. The counter Z2 has a counting capacity of 8 whereas the counting capacity of the counter Z1 depends on the pulse repetition frequency of the pulse train T1 and on the length of the telegraph signal pulses to be scanned. For example, if each telegraph signal pulse is 20 milliseconds long the scanning pulses must occur at the upper output *a* of the counting device Z1. If the pulses applied to input T1 occur at an interval of 1 millisecond the counting device Z1 must count to 20, but if they occur at intervals of 2.5 milliseconds the counting device Z1 need only count to 8.

Figure 2:
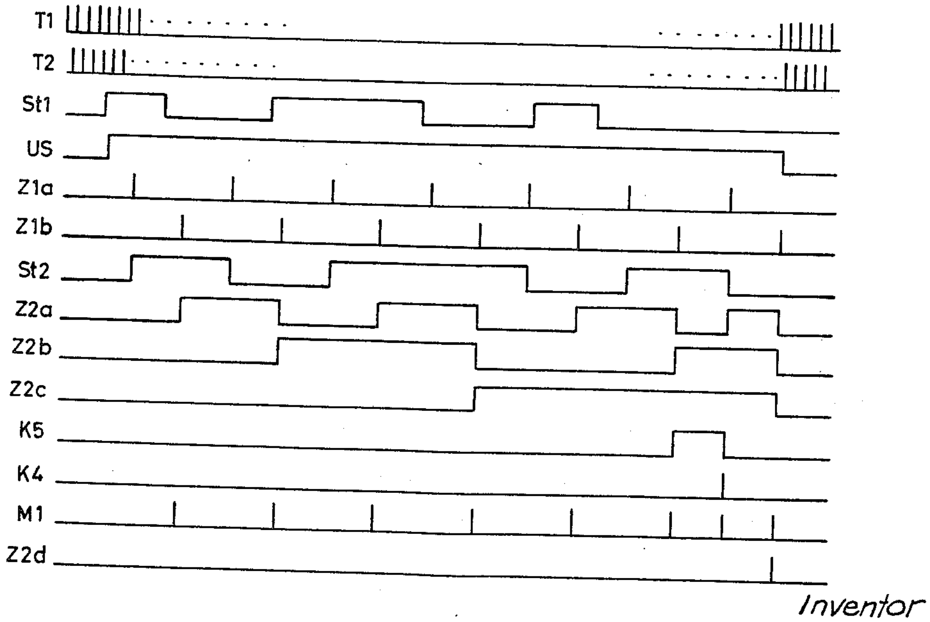

In the timing diagram (FIGURE 2) it is assumed that the counting device Z1 has a counting capacity of 8. The two clock pulse sequences applied to inputs T1 and T2 are shown 180° out of phase with each other in the first two rows and the relative operation times of the various elements in FIGURE 1 are shown in the other rows. A coincidence "AND" gating circuit K5 is operated by the counter Z2 during the nominal pulse duration of the sixth code element, that is during the period 120 to 140 milliseconds measured from the beginning of the start pulse. The output of the "AND" gate K5 is connected to an input of an "AND" gate K4 and activates this input of this gate during said period. A further input of the "AND" gate K4 is activated when the arriving telegraph signals have the same polarity as a stop pulse. Scanning pulses are applied to a third input of the "AND" gate K4. At the output of the "AND" gate K4 a pulse is therefore obtained when, during said period from 120 to 140 milliseconds, the arriving telegraph signals have stop polarity. In this case the signal is either the stop pulse of a five-unit signal or the last code element of a six-unit signal which has stop polarity. If the signal is of a six-unit code the stop pulse of this signal will have the same polarity so that the bi-stable device St2 need not be changed in state. The pulse obtained at the output of the "AND" gate K4 is therefore applied through a mixing gate M1 to the counter Z2 and switches the counter on by one counting unit.

If, however, start polarity is detected in the sixth code element then it is certain that a six-unit code signal is present. In this case the "AND" gate K4 is blocked during the period 120 to 140 milliseconds determined by the "AND" gate K5 and no pulse is obtained at the output of the "AND" gate K4. After eight pulses have been counted the output of the counter Z2 delivers a pulse which switches off the switching device US which thus resets the counters Z1 and Z2. The whole telegraphy circuit is thus returned to its initial inoperative condition. The instant at which the counter Z2 delivers the switching-off pulse to the switching device US thus depends on the polarity of the sixth code element. If during the sixth code element stop polarity is detected the distortion-removing cycle has a duration of seven pulse units. If during the sixth code element, however, stop polarity is not detected the distortion-removing cycle has a duration of 8 pulse units.

The invention has been described above with reference to a five and a six unit code. However it will be appreciated that the invention is equally applicable to systems using start-stop telegraph signals which are coded either in a code with $n$ or in a code with $n+1$ code elements. In this case the counting capacity of the counter Z2 will be to $n+1+2$ and the coincidence "AND" gating circuit K5 will be rendered operable during the period of the $(n+1)$th code element.

The circuit may be designed for a code with $n+1$ code elements and may be provided with a circuit device to return the circuit arrangement to its starting condition at an instant which is earlier by a time equal to one nominal pulse width when the $(n+1)$th code element has the same polarity as the stop pulse. If the $(n+1)$th code element has not the same polarity as the stop pulse a telegraph signal with $(n+1)$ code elements is definitely present. In this case the normal restoring sequence occurs. If, however, the $(n+1)$th code element has the same polarity as the stop pulse this may be due either to a telegraphy signal with $n$ or a telegraphy signal with $(n+1)$ code elements being present. For the restoring process, however, this is of no significance because a following stop pulse of a signal made up of $(n+1)$ code elements has the same polarity as the preceding code pulse so that the state of the bi-stable output device St2 need not be changed.

The second counting device Z2 has, in this case, a counting capacity of $(n+3)$ in accordance with the $(n+1)$ code elements and the start and stop pulses. Pulses are supplied to the counting device Z2 by the first counting device Z1 and these are phase-shifted by 180° with respect to the scanning pulses T1, i.e. they occur at the instances 20, 40 . . . milliseconds from the beginning of the start pulse. The first counting device Z1 then delivers a pulse at its output after having counted $(n+3)$ pulses and the whole telegraph circuit arrangement is thus returned to its initial inoperative condition. If the $(n+1)$th code element has the same polarity as the stop pulse, a pulse is also applied to the second counting device Z2 and the scanning time of the restorer is shortened by the time duration of a nominal pulse. The first input of the first "AND" gate K4 is activated when the arriving telegraphy signals have the same polarity as the stop pulse, the second input is activated during the period of the $(n+1)$th code element, scanning pulses being applied to the third input as explained above, the output of K4 being connected through the "OR" gate M1 to the input of the second counting device Z2. If the $(n+1)$th pulse has the same polarity as the stop pulse, the scanning pulse delivered by the counting device Z1 at the time of the nominal pulse centre of the $(n+1)$th code element can pass the first "AND" gate K4 and become effective as a counting pulse for the second counting device Z2. A second "AND" gate K5 is provided which is controlled in its conductive direction by the second counting device Z2 during the time period of the $(n+1)$th code element and this operates the first "AND" gate K4 during this period.

What I claim as my invention and desire to secure by Letters Patent of the United States is:

1. A telegraph pulse shaping circuit including means for receiving start-stop telegraph signals, means for scanning said received signals, bi-stable means controlled by said scanning means for transmitting correctly shaped pulses corresponding to said received signals, means for disabling said scanning means at the end of a predetermined number of pulse intervals after the receipt of a start pulse if the last pulse received before that time has stop polarity and for allowing said scanning means to operate for one further pulse interval if the last pulse received before said time has start polarity.

2. A telegraph circuit capable of restoring telegraph pulse signals in a start-stop telegraph system to a condition substantially free from distortion, including a circuit device for returning the telegraph circuit to its initial inoperative condition at an instant which is earlier by a time equal to the time duration of one pulse when a pulse occurring at a pre-determined time after each start pulse has the same polarity as a stop pulse than when the pulse occurring at said time has a different polarity from that of a stop pulse.

3. A telegraph circuit capable of restoring telegraph signals in a start-stop telegraph system to a condition substantially free from distortion, said signals being liable to be coded alternatively to have both $n$ and $(n+1)$ code elements, including a circuit device for returning the telegraph circuit to its initial inoperative condition at an instant which is earlier by a time equal to the time duration of one pulse when the $(n+1)$th pulse after a start pulse has the same polarity as a stop pulse than when said $(n+1)$th pulse has a different polarity from that of a stop pulse.

4. A telegraph circuit capable of restoring telegraph pulse signals in a start-stop telegraph system to a condition free from distortion, said pulses being liable to be coded to have both $n$ and $(n+1)$ code elements, including means for scanning each individual pulse substantially at the instant at which its pulse centre should occur, a first counting device for counting clock pulses in a first train of clock pulses and determining the instant at which its pulse centre should occur, a second counting device capable of counting $(n+3)$ pulses, the first counting device supplying to the second counting device clock pulses of a second train which are phase-shifted by 180° with respect to said clock pulses in said first train, said second counting device delivering an output to return the telegraph circuit to its initial inoperative condition after it has counted $(n+3)$ pulses and means for supplying a further pulse to the second counting device to cause it to deliver said output at an instant which is earlier by a time equal to the duration of one pulse when the $(n+1)$th pulse after a start pulse has the same polarity as a stop pulse than when said $(n+1)$th pulse has a different polarity to that of a stop pulse.

5. A telegraph circuit according to claim 4, including a first "AND" gating circuit having three inputs and one output, an "OR" gating circuit having an input connected to said one output and an output electrically connected to a pulse input of said second counting device, the first input of said first "AND" circuit being activated by the arrival of a telegraph signal pulse having the same polarity as a stop pulse, the second input being activated during said $(n+1)$th pulse, and the third input being activated by clock pulses of said first train.

6. A telegraph circuit according to claim 5, including a second "AND" gating circuit having a number of inputs connected to a corresponding number of outputs of said second counting device and an output connected to said second input of said first "AND" gating circuit, the second counting device activating each input of said second "AND" circuit during the period of said $(n+1)$th pulse to cause it to activate said second input of said first "AND" circuit.

7. A telegraph circuit according to claim 3, wherein $n=5$.

8. A telegraph circuit according to claim 4, wherein $n=5$.

9. A telegraph circuit according to claim 5, wherein $n=5$.

10. A telegraph circuit according to claim 6, wherein $n=5$.

11. A telegraph circuit capable of restoring telegraph pulse signals in a start-stop telegraph system to a condition substantially free from distortion including an input stage having an input terminal to which the telegraph signals are applied and a first and second output terminal and capable of assuming one of two states depending on whether the telegraph signal applied to its input is a mark or a space, a first counting device capable of counting clock pulses of a first clock pulse train applied to a first input terminal, a first two input "AND" gating circuit having one input connected to the first output of said input stage and activated when said input stage switches from its space to its mark state on the appearance of a start pulse at its input terminal and a second input activated by clock pulses of a second clock pulse train, a switching device having a first input connected to the output of said first "AND" circuit and operable when switched to one state via its first input to cause said first counting device to commence counting, a second counting device supplied by said first counting device with clock pulses which are phase-shifted by 180° with respect to the clock pulses in said first train, said second counting device being capable of delivering an output to a second input of said switching device to cause it to change to another state and deliver an output to cause the counting operation of the first counting device to stop after the second counting device has counted a pre-determined number of pulses, a bi-stable output stage having two inputs each connected to a separate output of said input stage through a further two input "AND" gating circuit, the other input of each further "AND" circuit being supplied with gating pulses by said first counting device, said first counting device delivering a pulse output to said second counting device to cause it to change said switching device to its other state at an instant which is earlier by a time equal to the time duration of one pulse when a pulse occurring a pre-determined time after each start pulse has the same polarity as a stop pulse than when the pulse occurring at said time has a different polarity from that of a stop pulse.

References Cited in the file of this patent

UNITED STATES PATENTS

| | | |
|---|---|---|
| 2,705,261 | Canfora et al. | Mar. 29, 1955 |
| 2,785,225 | Ostendorf | Mar. 12, 1957 |
| 2,822,422 | Terry et al. | Feb. 4, 1958 |